United States Patent
Vijayarangan (10) Patent No.: US 8,275,125 B2
(45) Date of Patent: Sep. 25, 2012

(54) METHOD FOR DESIGNING A SECURE HASH FUNCTION AND A SYSTEM THEREOF

(75) Inventor: Natarajan Vijayarangan, Andhra Pradesh (IN)

(73) Assignee: Tata Consultancy Services Ltd, Mumbai (IN)

( * ) Notice: Subject to any disclaimer, the term of this patent is extended or adjusted under 35 U.S.C. 154(b) by 1007 days.

(21) Appl. No.: 12/220,873

(22) Filed: Jul. 29, 2008

(65) Prior Publication Data
US 2009/0262925 A1    Oct. 22, 2009

(30) Foreign Application Priority Data
Apr. 21, 2008    (IN) .............................. 891/MUM/2008

(51) Int. Cl.
*H04L 9/28*    (2006.01)

(52) U.S. Cl. ......................................................... 380/28
(58) Field of Classification Search .................... 380/28, 380/29, 37, 42, 161, 165, 167, 176, 179, 380/180, 181
See application file for complete search history.

(56) References Cited

U.S. PATENT DOCUMENTS
2002/0122554 A1*    9/2002    Lilly .............................. 380/28
* cited by examiner

*Primary Examiner* — Gilberto Barron, Jr.
*Assistant Examiner* — Izunna Okeke
(74) *Attorney, Agent, or Firm* — Robert Plotkin, P.C.

(57) ABSTRACT

A system and method for designing a secure hash function is provided. Both of which have been designed for secure hash functionality, Secure Hash Algorithm (SHA-3) using pre processing (MP) methods and to help reduce hash collisions. It is a one way hash function which is a combination of message pre-processing which is a bijective function and the cipher block chaining mode (CBC).

42 Claims, 6 Drawing Sheets

METHOD FOR DESIGNING A SECURE HASH FUNCTION AND A SYSTEM THEREOF

FIELD OF THE INVENTION

This invention relates to the field of cryptography.

BACKGROUND OF THE INVENTION

In cryptography, a cryptographic hash function is a transformation that takes an input and returns a fixed-size string, which is called the hash value. Hash functions with this property are used for a variety of computational purposes, including cryptography. The hash value is a concise representation of the longer message or document from which it was computed. The message digest is a sort of "digital fingerprint" of the larger document. Cryptographic hash functions are used to do message integrity checks and digital signatures in various information security applications, such as authentication and message integrity.

A hash function takes a string (or 'message') of any length as input and produces a fixed length string as output, sometimes termed a message digest or a digital fingerprint. A hash value (also called a "digest" or a "checksum") is a kind of "signature" for a stream of data that represents the contents. One analogy that explains the role of the hash function would be the "tamper-evident" seals used on an application package.

When two messages have the same hash value, this is known as a collision. A good hashing functionality minimizes collisions for a given set of likely data inputs. There is a need for a means for designing and analyzing a hash function that could be used for digital signature technology.

In various standards and applications, MD (Message Digest) and SHA (Secure Hash Algorithm) versions have been consistently evolved, implemented and used.

The MD1, MD2, MD3, MD4, MD5 (Message-Digest) are a series of structured functions; widely used, cryptographic hash functions with a 128-bit hash value.

The SHA (Secure Hash Algorithm) versions (SHA-160, SHA-224, SHA-256, SHA-384, SHA-512 bits) are five cryptographic hash functions designed by the National Security Agency (NSA) and published by the NIST as a U.S. Federal Information Processing Standard. Hash functions compute a fixed-length digital representation (known as a message digest) of an input data sequence (the message) of any length. They are called "secure" when (in the words of the standard), "it is computationally infeasible to:
1. find a message that corresponds to a given message digest, or
2. find two different messages that produce the same message digest.

Any change to a message will, with a very high probability, result in a different message digest."

The recent advances in cryptanalysis of hash functions have been spectacular, and the collision attacks on MD5 and SHA-1 are of particular importance since these are so widely deployed.

MD5 collisions can be easily found. The analytical attack was reported to take one hour on an IBM p690 cluster. MD5 has been known to be weak for a long time but it is still used with no catastrophic consequences.

SHA-1 is also widely deployed but has collision-resistance problems. SHA-1 collisions are found if the number of rounds is reduced from 80 to about 50. In theory, collisions in SHA-1 can be found in $2^{69}$ attempts or hash evaluations. But this is only for a reduced-round version, and even then it is too expensive. So far no one has found collisions for SHA-1 using all rounds.

SHA-1 is derived from SHA-0, and SHA-256 is derived from SHA-1. These functionalities depend on intuition-based design that failed twice for SHA-0 and SHA-1. Given the attacks on the collision resistance of SHA-1 and the close relationship between the designs of SHA-1 and SHA-256, there is not much confidence on the collision resistance of SHA-256. Evaluation of SHA-256 is also difficult because it not known which attacks it was designed to protect against, or the safety margins assumed.

Thus, there is doubt over the design philosophy of the MD/SHA-family. Since the current class of functions is flawed, one option to counter this threat is to upgrade to a stronger hash function. Alternatively message pre-processing is a method that can be used for the above purpose. This technique can be combined with MD5 or SHA-1 so that applications are no longer vulnerable to the known collision attacks. The pre-processing function resists collision attacks in Hash functions. In this method, the given message (input) is pre-processed before being hashed. The rationale behind pre-processing is that the given message is made more random before being passed into the hash function. This reduces the redundancy in the input data, thus leading to a lower probability of finding a collision. This method is called Message Pre-processing.

A hash function is a one-way function that maps an arbitrary length message into a fixed length sequence of bits. There are two basic requirements for a secure hash function, namely, the collision resistance property that is, it should be hard to find two different messages with the same hash result and the pre-image resistance property, which means, given a hash value, it should be hard to find a message that would generate that hash value.

The definitions designated are:
The hash value of a message m as H(m).
Collision: find two distinct messages m, m' such that H(m)=H(m').
$1^{st}$ pre-image: Given a hash value HV, find m such that H(m)=HV.
$2^{nd}$ pre-image: Given a message m, find another message m' such that H(m')=H(m).
In a hash function of length n:
A brute force attempt to find a collision should require at least $2^{n/2}$ hash operations.
Brute force attempts to find $1^{st}$ and $2^{nd}$ pre-images should require at most $2^n$ hash operations.

A cryptographic hash function is a function with certain additional security properties to make it suitable for information security applications such as authentication and message integrity.

In 1990, Ronald Rivest proposed the MD4 Hash function (RFC 1320). Hans Dobertin published collision attacks on MD4 in 1996.

In 1991, Ronald Rivest improved MD4 and called it MD5 Hash function. The output of MD5 is 128 bits. Later, in the year of 2004, Xiaoyun Wang, Dengguo Feng, Xuejia Lai, and Hongbo Yu published collisions of full MD5.

The SHA (Secure Hash Algorithm) versions are five cryptographic hash functions designed by the National Security0 Agency (NSA) and published by the NIST as a U.S. Federal Information Processing Standard. SHA consists of five functionalities: SHA-1, SHA-224, SHA-256, SHA-384 and SHA-512. In the year of 1992, NIST published SHS (Secure Hash Standard) called now SHA-0. Joux, Carribault, Lemuet, and Jalby published collisions for full SHA-0 in 2004. In February 2005, an attack by Xiaoyun Wang, Yiqun Lisa Yin, and Hongbo Yu was announced. The attacks can find collisions in the full version of SHA-1, requiring fewer than $2^{69}$ operations.

The recent attacks on MD-5, SHA-0 and SHA-1 by Wang et al has given a huge impetus to research in designing practical cryptographic hash functions as well as cryptanalysis of existing functions. Hitachi Ltd. has patented special purpose hash functions using collision free and one-way properties. IBM has published SHA-IME (improved message expansion) to avoid differential attacks in SHA. Microsoft R&D has performed cryptanalysis of hash functions using Boolean Satisfiability (SAT) solvers. Tata Consultancy Services (TCS) has a patent pending regarding a cryptographic research work, which introduces a message pre processing function (MP) that is bijective and is used to reduce hash collisions.

PRIOR ART

U.S. Pat. No. 7,124,408 granted to Parthasarathy, Srivatsan et al discloses blinding by hash. There is provided a system and method for providing security to components or assemblies employed by application programs during runtime. Assemblies carry version information that can be used to enforce the versioning rules described by the application program. At runtime, version numbers requested by the application programs are compared with those version numbers of the assemblies that are actually found. In addition to comparing version numbers, the present invention offers a stricter form of version checking based on cryptographic hashes. An assembly is provided with module information that contains a list of the files that make up the assembly. Part of the information recorded about each module is a hash of the module's contents at the time the manifest was built. An assembly referencing another assembly computes the hash of the manifest of the referenced assembly. An assembly manifest may include dependency information, which is information about other assemblies that the assembly depends on or references. Part of the information stored as part of an assembly reference or manifest is a hash of the dependent assembly's manifest European patent Number 886399 by Takaragi, Kazuo et al describes Hash value generating method and device, data encryption method and device, data decryption method and device. Hash values, keys and cipher text, which have a high degree of data scrambling, are generated rapidly. When a message is sent, divisional data of the message are input, and injection extension processing is performed so that the data length of output data is longer than the data length of input data. Further, hash values are generated by a hash function containing multiplication processing, cyclic shift processing, etc U.S. Pat. No. 7,240,210 granted to M. Kivanc Mihcak and R. Venkatesan describes Hash value computer of content of digital signals. It further proposes a computer-implemented hashing method, comprising: transforming a digital signal into a digital signal transform; computing a first hash value representative of the digital signal such that perceptually distinct digital signals result in first hash values that are approximately independent of one another and perceptually similar digital signals result in proximal first hash values, wherein the computing of the first hash value comprises: obtaining the digital signal transform of the digital signal; quantizing the digital signal transform; geometric-region-growing the digital signal transform; based upon the geometrical-region-grown digital signal transform, generating the first hash value; computing a second hash value representative of the digital signal such that perceptually distinct digital signals result in second hash values that are approximately independent of one another and perceptually same digital signals result in identical second hash values, wherein the computing of the second hash value comprises: obtaining the digital signal transform of the digital signal; randomly dividing the digital signal transform into multiple chunks, each chunk containing signal data, wherein the dividing is carried out recursively to form hierarchical levels of overlapping chunks; averaging, for each of the chunks, the signal data to produce corresponding chunk averages; generating, based in part on the chunk averages, an exponential distribution having multiple distinct quantization levels; randomly rounding each of the chunk averages to one of the quantization levels to produce rounded values; hashing a composite of the rounded values; and storing the first and second hash values in relationship with the digital signal United States Patent Application Number 20060294386 by Yuval, Gideon A. and Venkatesan, Ramarathnam describes strengthening secure hash functions.

European Patent Number 0483424 granted to Scott, Jonathan Andrew discloses key hashing in data processors. A system is described for producing a near-random hash value from a key value. In a preferred embodiment the system comprises the steps of combining each key byte in turn with a corresponding byte in a predefined table; substituting each key byte with a byte from a second table, the location of the substitute byte in the table being equal to the value of the key byte; and using a propagated exclusive-OR to produce a four-byte value, which is then manipulated and scaled to produce a hash value in the desired range.

U.S. Pat. No. 7,151,829 granted to Vincenzo Condorelli and Camil Fayad discloses a system and method for generating a message digest comprising: receiving a block of data and processing the block of data to achieve a message digest, the processing of the block of data including evaluating the block of data at time (t) in terms of time (t-x), wherein x is greater than or equal to 2 and skipping one cycle per iteration in order to reduce a total number of cycles utilized for said processing of said block of data; wherein said block of data is 512-bits; wherein said message digest comprises 160-bits; wherein said processor performs the following: E(t)=C(t-2); D(t)=S30 [B(t-2)]; C(t)=S30 [A(t-2)]; B(t)=S5(A(t-2))+ft (B(t-2), C(t-2), D(t-2))+E(t-2)+Wt-1+Kt-1

European Patent Number 0149067 granted to Carter, John L. and Wegman, Mark N discloses polynomial hash. Elements X in a domain A are hashed onto a range B by selecting anyone of a plurality of hashing functions which collectively form an almost universal 2 class of functions.

U.S. Pat. No. 5,892,829 granted to Aiello, William A. and Venkatesan, Ramarathnam discloses method and apparatus for generating secure hash functions. Further there is provided a method for performing a hash function on a string of information elements, comprising the steps of (a). a stretch processor receiving an input string of information elements; (b). the stretch processor stretching the input string into a longer string; (c). a compression module receiving the longer string; and (d). the compression module compressing the longer string into a hash value U.S. Pat. No. 6,125,445 granted to David Arditti, Henri Gilbert, Jacques Stem and David Pointcheval discloses Public key identification process using two hash functions. Further on a process for the identification of a claimant by a verifier is provided. The process is of the public key type, where the public exponent is equal to 3. The claimant draws at random a first exponent .alpha., calculates r=g.sup.alpha. mod n and transmits R=r.sup.3. The verifier draws at random a second exponent .beta., calculates t=g.sup.beta. mod n, calculates T=t.sup.3 mod n and h=H.sub.1 (Z), where H.sub.1 is a hash function, and calculates Z=R.sup.3 mod n. The verifier transmits to the claimant the numbers T and h. The claimant calculates Y=T.sup.alpha. mod n, verifies the result H.sub.1 (Y), calculates H=H.sub.2 (Y), where H.sub.2 is another hash function, calculates z=rS mod n, and transmits z and H. The claimant also has a secret number S equal to the modulo n cubic root of a number I deduced from its identity so that the number S verifies S.sup.3=1 mod n. The verifier verifies that H received is equal to H.sub.2 (Z) and that z.sup.3 is equal to RI mod n U.S. Pat. No. 6,226,629 granted to Cossock, David describes method and apparatus determining and using hash functions and hash values. There is also provided a method of determining a pair of hash values, by a data processing system having a memory, comprising: choosing four 32-bit random values and storing them in the memory; determining two hash values from pairwise independent hash functions h1(x)=cx+d (mod p) and h2(x)=dx+c (mod p), where c=a first 32-bit result value c and where d=a second 32-bit result value d and where p is a prime number, wherein said hash functions are determined in accordance with the four 32-bit random values from the memory and a 32-bit value x also from the memory, using only linear arithmetic and 4-byte machine register operations U.S. Pat. No. 6,275,919 granted to Peter Johnson describes memory storage and retrieval with multiple hashing functions. There is also provided a method for determining a first index value for a first set of incoming data during a first preselected time period, the first index value generated according to a first hashing function using a hash generator configurable to providing a plurality of hashing functions and storing the first set of incoming data in a memory based on the first index value, and storing an indication that the first hashing function generated the first index value and changing the hash generator, in response to an input, from providing the first hashing function to providing a second hashing function and also determining a second index value for a second set of incoming data during a second preselected time period, the second index value generated according to the second hashing function; and storing the second set of incoming data in the memory based on the second index value, and storing an indication that the second hashing function generated the second index value United States Patent Application Number 20080046741 granted to Mironov, Ilya describes protecting signatures using collision-resistant hash functions.

U.S. Pat. No. 4,588,985 granted to Carter, John L. Wegman, Mark N. describes polynomial hash. The data element to be hashed is separated into individual sub-strings $x_1$ through $x_n$ of no more than log 2(b) bits in length, where b is an integer, and the hashing functionality is a polynomial of the form $f_y(x)=(y_0 x_1 + y_1 x_2 + \ldots + y_{n-1} x_n)$ (mod b). Elements x in a domain A are hashed into a range B by selecting any one of a plurality of hashing functions which collectively form an almost universal.sub.2 class of functions. The data element to be hashed is separated into individual sub-strings x.sub.1 through x.sub.n of no more than log.sub.2 (b) bits in length, where b is an integer, and the hashing algorithm is a polynomial of the form f.sub.y(x)=(y.sup.0x.sub.1+y.sup.1x.sub.2+ . . . +y.sup.n−1x.sub.n) (mod b). In general, for a finite field of b=p.sup.k elements, where k is a positive integer, there will be a hash function defined by the formula f.sub.y (x)=y.sup.0x.sub.1+y.sup.1x.sub.2+ . . . +y.sup.n−1x.sub.n, where the addition and multiplication operations are those defined by the finite field and y is an element of the field. In a second embodiment, the hashing is a two-stage process defined by g.sub.z (f.sub.y(x)), where f.sub.y(x) is defined as above and g.sub.z is a function selected from a known universal.sub.2 class of hash functions U.S. Pat. No. 5,892,829 granted to William A. Aiello et. al. discloses a design of secure hash function based on stretch function and compression function. The stretch function is one-way. The compression function is a cryptographic primitive selected from a family of compression functions. A standard key scheduling functionality of the cryptographic compression function (such as DES) is replaced and an output of the stretch function is used as the key. The stretch function output randomizes the input string. Further the security constraints on the compression function are less stringent. A secure hash function uses a stretch function 202 and a compression function 202 to provide a secure hash value. A stretch function is a function which increases an input string (pre-image). In one version of the invention, a stretch function .function. maps 1-bit inputs into 2m bit, where 2m>1. Preferably, the stretch function .function. is one-way. The stretch function randomizes the input string. The output of the stretch function is fed into a compression function c, which compresses the stretch function output from 2m bits to 2n bits, where m>n. The compression function is preferably a cryptographic primitive selected from a family of compression functions. In a preferred embodiment, a standard key scheduling algorithm of the cryptographic compression function (such as DES) is replaced and an output of the stretch function is used as the key. The inventors find that using a stretch function output as the compression function key improves the security of the compression function. Moreover, because the stretch function output randomizes the input string, the security constraints on the compression function are less stringent. As a result, an efficient, simple, and secure hash function is provided U.S. Pat. No. 6,021,201 granted to Derek L. Davis et. al. discloses a cryptography unit having a cipher unit and a hash unit, both are coupled in parallel for simultaneous ciphering and hashing. The cipher unit implements a cipher functionality that operates on a data block having a first predetermined size M. The hash unit implements a hash functionality on a data block having a second predetermined size N. Buffers of a size Q, where Q is an integer multiple of M and N, are employed to receive the input data into the invention. A security unit ensures that the cipher unit and the hash unit operate on the same data block of size Q.

European Patent Number 1556781 granted to Plessier et. al. discloses an apparatus which is arranged to accept digital data as an input, and to process said data according to one of either the Secure Hash Algorithm (SHA-1) or Message Digest (MD5) functionality to produce a fixed length output word. The apparatus includes a plurality of rotational registers for storing data, one of the registers being arranged to receive the input data, and data stores for initialisation of some of said plurality of registers according to whether the SHA-1 or MD5 algorithm is used. The data stores include fixed data relating to SHA-1 and MD5 operation. Also included is a plurality of dedicated combinatorial logic circuits arranged to perform logic operations on data stored in selected ones of said plurality of registers.

U.S. Pat. No. 6,091,821 granted to Mark Leonard Buer discloses a pipelined hardware implementation of hash functions. A hardware implementation of a hashing algorithm is presented. In a first pipeline stage, a first memory stores input data for the hashing algorithm. Data is selected out of the first memory, for example, using a counter which is reset and incremented by differing values depending upon the round of the algorithm. A second memory stores constants used for the hashing algorithm. Constants are selected out of the second memory, for example, using a counter. An adder adds data from the first memory and a constant from the second memory with a state value selected, for example, using a multiplexer. The result is stored as an intermediate algorithm value in a first pipeline register. In a second pipeline stage a second adder adds one of a plurality of hashing function values to the intermediate algorithm value in the first pipeline register. The result is shifted. A third adder adds the shifted result to one of the plurality of state values and places the result into a second pipeline register.

U.S. Pat. No. 6,141,421 granted to Hiroyuki Kurumatani et al discloses a method and apparatus for generating hash value. The method transforms input data to data having an arbitrary length so that the resultant data is difficult to be inversely transformed. The method generates a hash value of data generated from the input data and random number data, executes a one to one transformation to a part of the input data by using the hash value as a parameter and outputs the intermediate generation data as a part of masking data; and executes the one to one transformation to a part of the input data by using intermediate generation data obtained during the one to one transformation.

U.S. Pat. No. 6,052,698 granted to Bennet et al discloses the reorganization of collisions in a hash bucket of a hash table to improve system performance. An improved hashing system is provided that takes advantage of the caching architecture of many of today's processors to improve performance. Some of today's most advanced processors, like PENTIUM processor, have a two level caching scheme utilizing a primary cache and a secondary cache, where data contained in the primary cache is accessible 50-150 times faster than data in main memory. The improved hashing system ensures that collision occur so that the buckets contain many entries, and at runtime, the entries in the buckets are reordered to increase the number of times that the primary cache of the processor is used and to reduce the number of times that main memory is used, thereby improving the performance of the hashing system.

United States Patent Application Number 20060294386 granted to Yual Gideon et al discloses a system to strengthen secure hash functions.

India Patent Application Number 1937/MUM/2007 by Natarajan Vijayarangan, discloses a message pre processing method is used to reduce hash collisions.

U.S. patent application Ser. No. 12/079,573 by Natarajan Vijayarangan, discloses a method for preventing and detecting hash collisions of data during the data transmission.

There is a need for a secure, more robust secure hash function with reduced rate of hash collisions.

OBJECT OF THE INVENTION

An object of this invention is to provide a system and method to prevent hash collisions.

Another object of this invention is to provide a system and method, which provide a secure hash function.

SUMMARY OF THE INVENTION

The present invention envisages a system and method for establishing a secure hash functionality using message pre processing (MP) methods, and to help reduce hash collisions. Hash functions compute a fixed length digital representation (known as a message digest) of an input data sequence (the message) of any length.

In accordance with this invention, there is envisaged a system and method for designing and implementing a secure hash functionality, which is different from the existing hash functionalities. This secure hash algorithm is a one-way hash function, which is a combination of message pre processing bijective function) and cipher block chaining (CBC) mode. Cipher block chaining refers to a means for providing a symmetric function for carrying out encryption and decryption which operated on blocks of data having a fixed length; the CBC mode especially relates to a method wherein each block of plaintext is XORed with the previous ciphertext block before being encrypted. This way, each ciphertext block is dependent on all plaintext blocks processed up to that point. Also, to make each message unique, an initialization vector (IV) must be used in the first block.

The system and method includes two stages carried out by a padding means and a computation means respectively, performed in a sequential manner; a padding means is adapted to perform padding and a computation means is adapted to perform hash computation. The padding divides an incoming message into m blocks of a fixed length and adds an initialization vector (IV) to the message. The message pre processing involves performing bijective operations viz.: Shuffling, T-function and Linear Feedback Shift Register (LFSR). These operations are used in the hash computation, which is performed on each input block of a fixed length in Cipher Block Chaining (CBC) mode with iterative rounds. The final value generated by the proposed hashing is used to determine the message digest/hash value.

In accordance with this invention, the method for establishing a secure hash function for computing an output message digest from an input message comprises the steps of:

(a) Receiving an input message for obtaining a corresponding output message digest;
(b) Determining the length of said output message digest;
(c) Selecting a Secure Hash function in terms of said length of said output message digest;
(d) Dividing said input message into blocks of pre-defined length;
(e) Engaging a comparator means for comparing the size of said input message with said message digest length;
(f) Engaging a padding means for performing a padding function of adding an initialization vector to said input message if said input message size is less than said message digest length, said padding function being performed to obtain a padded message divided into m-blocks, each of said m-blocks having size equal to the length of said message digest,
(g) Engaging a hash computation means in Cipher Block Chaining mode with iterative rounds containing message pre processing processes of Shuffling said padded message to obtain a shuffled message, T-functioning said shuffled message to obtain a T-functioned message, and Linear Feedback Shift Registering said T-functioned message to obtain a hash computed value; and
(h) Outputting a hash output value of the message after a pre-determined number of iterative rounds of said hash computation, each followed by said message pre processing.

In accordance with this invention, a system for establishing a secure hash function for computing an output message digest from an input message comprises:

input means adapted to input said message for obtaining a corresponding output message digest;
determining means adapted to determine the length of said output message digest;
selection means adapted to select a secure hash function in terms of number of said length of said output message digest;

division means adapted to divide said input message into blocks of pre-defined length;

comparator means adapted to compare the size of said input message with said message digest length;

padding means adapted to perform a padding function of adding an initialization vector to said input message if said input message size is less than said message digest length, said padding function being performed to obtain a padded message divided into m-blocks, each of said m-blocks having size equal to the length of said message digest;

hash computation means adapted to perform hash computation in Cipher Block Chaining mode to obtain hash computed value;

message pre processing means adapted to perform message pre processing on said hash computed value; and iteration means adapted to performing a pre-determined number of iterations of said hash computation in Cipher Block Chaining mode, each followed by said message pre processing to obtain a hash output value.

The secure hash algorithm functionalities takes an input message of any size and returns a fixed size output (224/256/384/512-bits). The hash functionality provided by the system and method in accordance with this invention is an iterative, one-way hash function in which padding, message pre processing and hash computation are involved. The functionality comprises the following operations to perform: Padding, Message Pre processing (Shuffling, T-function, LFSR) in CBC mode with iterative rounds. The given message is passed into respective means performing the above operations, which produce a hash output. The three operations: Shuffling, Tfunction and LFSR are part of message pre processing.

In accordance with an embodiment of this invention, there is provided a padding means. Padding operation divides any message into m-blocks of a fixed length (224/256/384/512-bits). If the message size is less than the length of message digest, the given message is added with an initialization vector (IV) having the same message digest length. Otherwise, there is no IV added to a given message. For instance, secure hash algorithm (224 bits) functionality is used to compute hash for a given message less than 224 bits. Then the given message is XORed with the initialization vector (IV)=$2^{223}$=1000 . . . 0 (1 followed by 223 zeros). Hence the given message becomes 224 bits, which will be passed into the CBC mode with iterative rounds (hash computation).

In accordance with another embodiment of this invention, there is provided a hash computation means. After padding, the hash computation process starts. It is based on CBC mode with iterative rounds. In the CBC mode, the input message is divided into m-blocks of fixed size (which depends upon the message digest length) and each block of input is XORed with the output of the previous message pre processing operation. This process/round takes place 6 times in the hash computation using CBC mode. In the first round of CBC mode, a constant value (whose bit length≦message digest length) must be XORed to the first block of the input message and the outcome is passed into the MP operation, which is again XORed with the second block of the input message. This XORing process continues till the end of the last block and produces a message digest of fixed size that is the output of first round. From second round to sixth, the output of previous round is XORed with the same constant value, then the outcome is passed into the MP operation (that is known as first step) and the same process continues till the end of the last step. After completing six rounds, the CBC operation produces a hash output.

For instance, the given message is divided into a sequence of equal sized blocks and the total number of blocks is m. The size of each block is chosen to be 32×n, where n (7/8/12/16) depends upon a message digest length (224/256/384/512 bits). There is no loss of generality to put a constant value=0 in all rounds of CBC operation so that the first block of the input message is directly passed into the first round and the XORing process continues till the end of $m^{th}$ block. From second round to sixth, the output of previous round is passed into the MP operation and the same process goes up to s steps, where s denotes the number of blocks. After completion of six rounds, the hash output of fixed length size (32×n) is obtained. The number of blocks for first round is not always the same as the number of blocks for second round onward.

In accordance with still another embodiment of this invention, there is provided a Message Pre processing means which further includes:

Shuffling means;
T-functioning means; and
Linear Feedback Shift Registering means The shuffling means is adapted to perform shuffling operation which divides the message into 32-bit words and shuffles them. It interleaves the bits in two halves of each word. The shuffling procedure used is an outer perfect shuffle, which means the outer (end) bits remain in the outer positions. If the 32 bit word is (where each element denotes a single bit) denoted by:

$a_1a_2a_3a_4\ a_5a_6a_7a_8\ a_9a_{10}a_{11}a_{12}\ a_{13}a_{14}a_{15}a_{16}\ b_1b_2b_3b_4\ b_5b_6b_7b_8\ b_9b_{10}b_{11}b_{12}\ b_{13}b_{14}b_{15}b_{16}$, then the outer perfect shuffle makes it as:

$a_1b_1a_2b_2\ a_3b_3a_4b_4\ a_5b_5a_6b_6\ a_7b_7a_8b_8\ a_9b_9a_{10}b_{10}\ a_{11}b_{11}a_{12}b_{12}\ a_{13}b_{13}a_{14}b_{14}\ a_{15}b_{15}a_{16}b_{16}$

In a similar manner, the shuffling means performs the shuffling operation on each 32-bit word of the entire padded message. The shuffling operation is simple to keep the overall method fast and yet to have a statistical effect on the output. The Shuffling of bits helps to improve the diffusion property of the input. The inverse of the shuffle operation can easily be accomplished by performing the swaps in reverse order. Therefore, the shuffling operation is bijective.

The T-functioning means is adapted to perform a T-function which is a bijective mapping that updates every bit of the state in a way that can be described as $y_i=x_i+f(x_0, \ldots, x_{i-1})$, or in simple words is an update function in which every bit of the state is updated by a linear combination of the same bit and a function of a subset of its less significant bits. If every single less significant bit is included in the update of every bit in the state, such a T-function is called triangular. All the boolean operations and most of the numeric operations in modern processors are T-functions, and all their compositions are also T-functions. The T-function helps to achieve the avalanche effect. The avalanche effect tries to mathematically abstract the much desirable property of highly nonlinearity between the input and output bits, and specifies that the hashes of messages from a close neighborhood are dispersed over the whole space. Because T-functions are bijective, there are no collisions, and hence no entropy loss regardless of the boolean functions and regardless of the selection of inputs. Therefore there is no entropy loss. After shuffling, the T-function takes the input from the output of shuffling and brings to perform the avalanche effect on the input. The T function used for the purposes of the system of this invention is $(2x^2+x)$ mod $2^{32}$, where x is a 32-bit word. This is an invertible mapping, which contain all the $2^n$ possible states on a single cycle for any word size n (where n=32).

The Linear Feedback Shift Registering (LFSR) means is adapted to perform Linear Feedback Shift Register function.

Primitive polynomials over $GF(2^n)$ [where $GF(2^n)$ refers to Galos Field (or a finite field) over $2^n$ elements] are useful in the design of LFSRs for generating sequences for maximum period. More number of taps in primitive polynomials that are random have been used. The primitive polynomial used is $x^{32}+x^{26}+X^{23}+x^{22}+x^{16}+x^{12}+x^{11}+x^{10}+X^8+X^7+X^5+X^4+X^2+x+1$. This is an irreducible polynomial of degree 32 whose period is $2^{32}-1$. Each time the 32-bit input is executed for different number of rounds. Thus, even if the input bits are identical, the output will be random.

The method for generating the code for LFSR can be listed as follows:
1. Input: $f(x)=x^n+x^{s1}+x^{s2}+\ldots+x+1$
2. Write: $x^n=x^{s1}+x^{s2}+\ldots+x+1$ and express in binary form.
3. Compute one left shift for the entire binary value of $x^n$
   3.1 P1: Left shifting for all bits except nth position bit
   3.2 P2: Left shifting on every nonzero nth position bit=binary expression of $x^n$
   3.3 Compute: $x^{n+1}$=P1+P2 (mod 2)

In the above LFSR method, every bit in the binary expression of $x^n$ should be shifted into left except the nth position bit. For nth position bit, the same binary expression of $x^n$ is to be taken. On adding these two binary expressions with respect to mod 2, $x^{n+1}$ could be obtained. The LFSR takes the input from the output of T-function and produces the output containing a maximal period cycle.

The method for generating the code for the secure hash algorithm can be listed as follows:
1. Fix the message digest length.
2. Select the secure hash algorithm in terms of number of bits.
3. Input the message for padding.
4. Engage the padding means for performing the padding function, typically to have m-block having size equal to the message digest length.
5. Engage a comparator means for comparing the size of message with the message digest length.
5.1 Is message size is lesser than message digest size, create the initialization vector (IV).
6. Engage the hash computation means in CBC mode with iterative rounds.
6.1 message pre processing occurs in first iterative round.
6.2 further iterative rounds follow.
7. Typically, after 6 iterative rounds, the system belches a hash value of the message.

Applications of Message Pre Processing (MP) in S-Box Construction:

Typically, an S-box (Substitution box) for AES functionalities can be constructed using message pre processing methods. This S-box would be adapted to typically produce 16×16 matrices derived from an 8-bit message pre processing method and $S^{-1}$-box can be obtained by reversing the S-box entries. The benefits of the S-box models are: the Rijndael S-box is costly to implement and there is no theory proposed for the Rijndael S-box. It is proved that this S-box is equivalent to the Rijndael S-box in terms of security and can easily be implemented.

The S-box would typically be a 16×16 dimensional S-box which has 256 values. The steps for construction of an S-box are as follows:
1. Initialize a 16×16 matrix.
2. Engage the shuffling means to perform an 8-bit message pre processing
3. Engage the T-functioning means over the output of the shuffling means
4. Engage the Linear Feedback Shift Registering means over the results of the T-functioning means.
5. Repeat the action for 16 times Implementation Results:

The following results are based on the hash functionalities in accordance with this invention with respect to 224, 256, 384 and 512 bits.
For the secure hash algorithm (224-bit):
A1.
Let the message be the 24-bit ASCII string "abc", which is equivalent to the following binary string: 01100001 01100010 01100011. The resulting 224-bit hash value of the given message is a7c1ba2ba9f68a44c77742b9920975c0b580f41585fae-36887b8eab2.
A2.
Secure hash algorithm (224-bits) ("The quick brown fox jumps over the lazy dog")=e3b96e3dc9c91 dbdf7d17aaOd6c4bc71d7644806eeel0b9d8dec3040
Even a small change in the message will (with overwhelming probability) result in a completely different hash, example changing d to c:
Secure hash algorithm (224-bits) ("The quick brown fox jumps over the lazy cog")=9ac905d8ab 1 eOf08baf9a9afea8ed424e2e8fefea6a8fedf8267 cc62
A3.
The resulting 224-bit hash value of Null string/Zero-length message (" ") is f9a39cb8b7a1ffd1a9e9a15bcb06e-666fc9746bd9177c 1138908e37a
For the secure hash algorithm (256-bit):
B1.
Let the message be the 24-bit ASCII string "abc", which is equivalent to the following binary string: 01100001 01100010 01100011.
The resulting 256-bit message digest is e5861e2f82bc7a6f9808a6259ae11d28f873b5e5e25f2719aa-03a417d6327983.
B2.
Secure hash algorithm (256-bits) ("The quick brown fox jumps over the lazy dog")=e89481dlc8e7745aa48ca-053b67ef83fa96902fbc065c6c299da2bfecbb42e59
Even a small change in the message will (with overwhelming probability) result in a completely different hash, example changing d to c:
Secure hash algorithm (256-bits) (liThe quick brown fox jumps over the lazy cog")=c90968clc88deI708cf441c-3ge68f98abb9b61caf74b0818dc7c4d55cfebdb9f
B3.
The resulting 256-bit hash value of Null string/Zero-length message (" ") is f4c76902880cd7c6e32c429ade-87f9239be5d95494906eaab41e9ff6ade7271b
For secure hash algorithm (384-bit):
C1.
Let the message be the 24-bit ASCII string "abc", which is equivalent to the following binary string: 01100001 01100010 01100011.
The resulting 384-bit message digest is-b8990ecef405285ae43865f8a2c02c7fc168035dc64d7c14c7-270f99a0973c13 8754104ef6805edbb6d2e65497ffdfb3.
C2.
Secure hash algorithm (384-bits) ("The quick brown fox jumps over the lazy dog")=e7cfeb098697e913968438-7ecff2cfebbe3314aca2a5137fd0397c34ff8df97adOla d3cdb9041a30ae3d3 dbcda46de4I.
Even a small change in the message will (with overwhelming probability) result in a completely different hash, example changing T to r:
Secure hash algorithm (384-bits) ("rhe quick brown fox jumps over the lazy dog")=aa3346448a3dc7dea- 87d7ac2f24b542fd8a425969dOcca21d23236e5bdbO779bd-98f60ecccf24571b2cd2e3cbbf94f0c.

C3.

The resulting 384-bit hash value of Null string/Zero-length message (" ") is bfb48357ffd878a1f3a5fe4-5f0326f8eef09ed59808acf75b755d4b3da6868fb96 46a9ef9f73101bb349866de088eaa1.

For secure hash algorithm (512-bit):

D1.

Let the message be the 24-bit ASCII string "abc", which is equivalent to the following binary string: 01100001 01100010 01100011.

The resulting 512-bit message digest is a99ecd5-6fabc87f5e9011d81bc8ee609dd5ef5f7b1547a79811d528ee-da030518 a32d745d8cf80c96c6aef9dbf025fa32d7d694a5e7f4fc5cbc 1b50e2c659fde6.

D2.

Secure hash algorithm (512-bits) (The quick brown fox jumps over the lazy dog")=8089-4ee98d03c03ge8f92f48a33e441787b8feObc52bflfdbd293f-51a9a0222cab26 999ae751fa29c487b9d2adle7b2e86755463db8f2a80fOc8c-2468c6be5ff Even a small change in the message will (with overwhelming probability) result in a completely different hash, example changing T to r:

Secure hash algorithm (512-bits) ("rhe quick brown fox jumps over the lazy dog")= e8377cf7d9a71747a79810c3c609268 db92eb22cb76b2408e03fa9fa9b27f9fac01 ffbfefabe576ed6b69acba1a10f0cee170d65b35afdbfb11a7f-1c96533f62

D3.

The resulting 512-bit hash value of Null string/Zero-length message (" ") is e3e065acb071e655-fb117ceeabf4cda4b54d7a6bd11619aeeb62b7c2bcf164a1f 6e0c304a943c620e0f4b605f54914bff33ad97da549a6c1c-de403a3b5f6b464.

Statistical random test for:

The output of hash value behaves like a random number that can be used in digital signature protocols. For instance, consider H=concatenation of 100 distinct hash values for the secure hash algorithm (256-bit)=25600 bits and then compute cipher text C=(H+M) mod 2, where M is a large size message. It is observed that the cipher text C behaves like random due to distinct hash values.

The following statistical reports satisfy the relationship C=(H+M) mod 2.

Entropy of the Original File (M)

Entropy=3.124613 bits per byte.

Optimum compression would reduce the size of this 28672 byte file by 60 percent.

Chi square distribution for 28672 samples is 2489498.79, and randomly would exceed this value 0.01 percent of the times. Arithmetic mean value of data bytes is 71.1914 (127.5=random).

Monte Carlo value for Pi is 3.174550021 (error 1.05 percent).

Serial correlation coefficient is 0.806530 (totally uncorrelated=0.0).

Entropy of the cipher text=(H+M) mod 2, where H=100 different Hash values

Entropy=6.045497 bits per byte.

Optimum compression would reduce the size of this 28672 byte file by 24 percent.

Chi square distribution for 28672 samples is 157791.80, and randomly would exceed this value 0.01 percent of the times.

Arithmetic mean value of data bytes is 98.8841 (127.5=random).

Monte Carlo value for Pi is 3.506906656 (error 11.63 percent).

Serial correlation coefficient is 0.589537 (totally uncorrelated=0.0).

Survey of Hash Functionalities

The following table shows secure hash algorithm functionality produced by the system and method in accordance with this invention as compared with other hash functionalities.

TABLE 1

| Name of the hash functionality | Block size (bits) | Word size (bits) | Output size | Rounds | Year of the standard/publication |
|---|---|---|---|---|---|
| MD4 | 512 | 32 | 128 | 48 | 1990 |
| MD5 | 512 | 32 | 128 | 64 | 1992 |
| SHA-0 | 512 | 32 | 160 | 80 | 1993 |
| SHA-1 | 512 | 32 | 160 | 80 | 1995 |
| RIPEMD-160 | 512 | 32 | 160 | 5 | 1996 |
| SHA-224 | 512 | 32 | 224 | 64 | 2004 |
| SHA-256 | 512 | 32 | 256 | 64 | 2002 |
| SHA-384 | 1024 | 64 | 384 | 80 | 2002 |
| SHA-512 | 1024 | 64 | 512 | 80 | 2002 |
| Whirlpool | 512 | — | 512 | 10 | 2003 |
| Secure hash algorithm (224) | 224 | 32 | 224 | 6 | 2008 |
| Secure hash algorithm (256) | 256 | 32 | 256 | 6 | 2008 |
| Secure hash algorithm (384) | 384 | 32 | 384 | 6 | 2008 |
| Secure hash algorithm (512) | 512 | 32 | 512 | 6 | 2008 |

With respect to one aspect of the invention there is provided a method for designing a secure hash function, the method comprising the steps:

(a) Fixing the length of message digest (b) Selecting the Secure Hash Algorithm in terms of number of bits.

(c) Inputting the message for padding.

(d) Engaging the padding means for performing the padding function to have m-block having size equal to the length of message digest (e) Engaging a comparator means for comparing the size of message with the message digest length.

(f) Engaging the hash computation means in CBC mode with iterative rounds.

(g) Outputting a hash value of the message after six iterative rounds

With respect to another aspect of the invention there is provided a system for designing a secure hash function, the system comprising (a) An input means for inputting the message (b) Padding means (c) Comparator means (d) Hash computation means (e) Message pre processing means The features and advantages of the present invention will become more apparent from the ensuing detailed description of the invention taken in conjunction with the accompanying drawings

INDUSTRIAL APPLICATIONS

The hash function produced by the system and method in accordance with this invention described above finds a number of applications in Information Security. Some specific areas where our invention can be applied are:
1. Signature protocols
2. Digital Identity
3. Access Control
4. Multifactor Authentication
5. Message Authentication Code (MAC)
6. Data integrity in a relational database

BRIEF DESCRIPTION OF THE ACCOMPANYING DRAWINGS

The invention is described with reference to the accompanying drawings in which.

DETAILED DESCRIPTION OF THE ACCOMPANYING DRAWINGS

Figure 1:
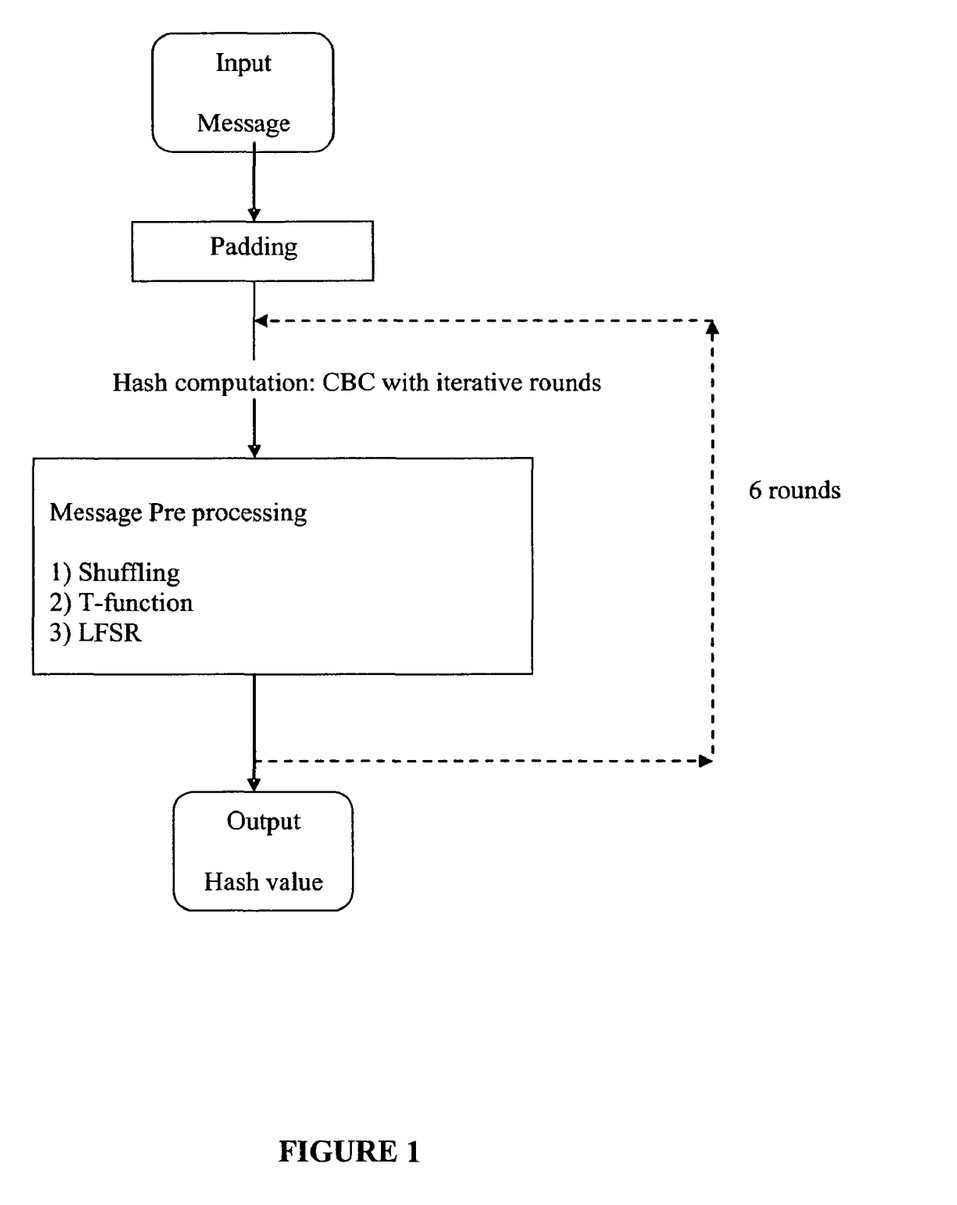
FIG. 1 illustrates hash process produced by the system and method in accordance with this invention.

FIG. 1 illustrates hash process produced by the system and method in accordance with this invention. This system and method outlines a designing and implementation scheme for a secure hash functionality. The secure hash function is a one-way hash function, which is a combination of message pre processing (bijective function) and cipher block chaining (CBC) mode. The system and method in accordance with this invention includes two stages carried out by a padding means and a computation means respectively, performed in a sequential manner. A padding means is adapted to perform padding and a computation means is adapted to perform hash computation. The padding divides an incoming message into m blocks of a fixed length and adds an initialization vector to the message. The message pre processing involves performing bijective operations viz.: Shuffling, T-function and Linear Feedback Shift Register (LFSR). These operations are used in the hash computation, which is performed on each input block of a fixed length in Cipher Block Chaining (CBC) mode with iterative rounds. The final value generated by the proposed hashing is used to determine the message digest/hash value.

The secure hash algorithm functionality takes an input message of any size and returns a fixed size output (224/256/384/512-bits). The hash functionality provided by the system and method in accordance with this invention is an iterative, one-way hash function in which padding, message pre processing and hash computation are involved. The functionality comprises the following operations to perform: Padding, Message Pre processing (Shuffling, T-function, LFSR) in CBC mode with iterative rounds. The given message is passed into respective means performing the above operations, which produce a hash output. The three operations: Shuffling, Tfunction and LFSR are part of message pre processing.

Figure 2:
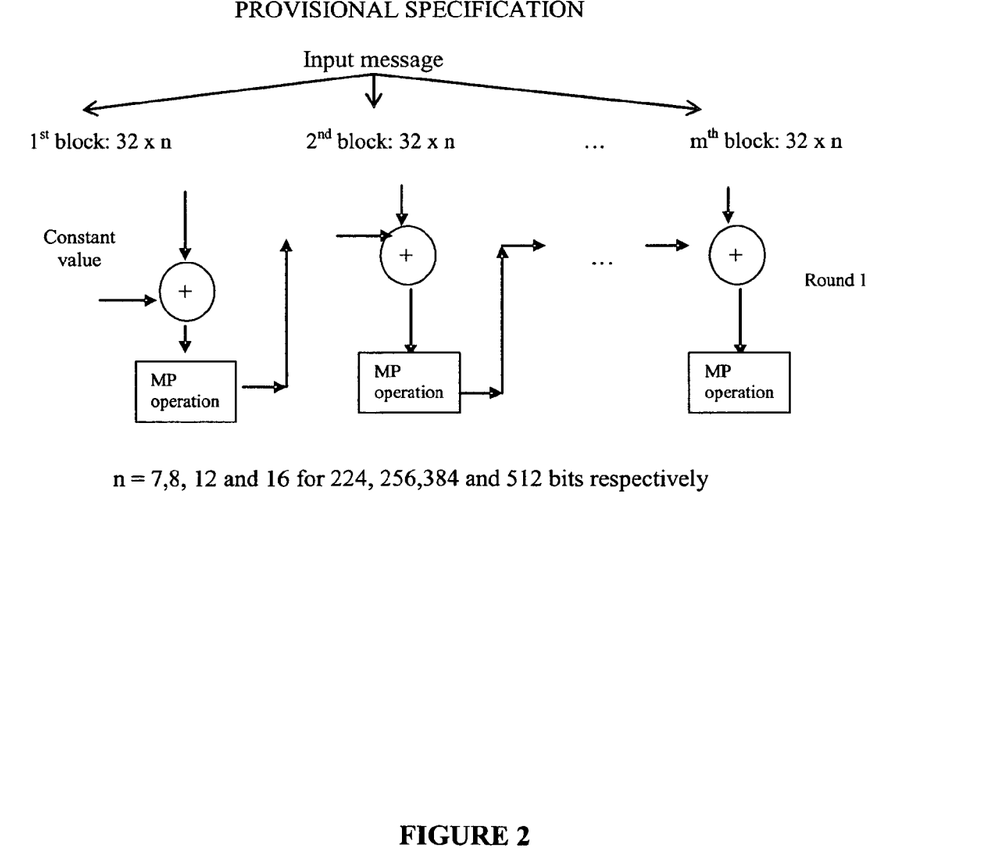
FIG. 2 illustrates CBC round one of the hash function in accordance with this invention.

FIG. 2 illustrates CBC round one of the hash function in accordance with this invention. After padding, the hash computation process starts. It is based on CBC mode with iterative rounds. In the CBC mode, the input message is divided into m-blocks of fixed size (which depends upon the message digest length) and each block of input is XORed with the output of the previous message pre processing operation.

Figure 3:
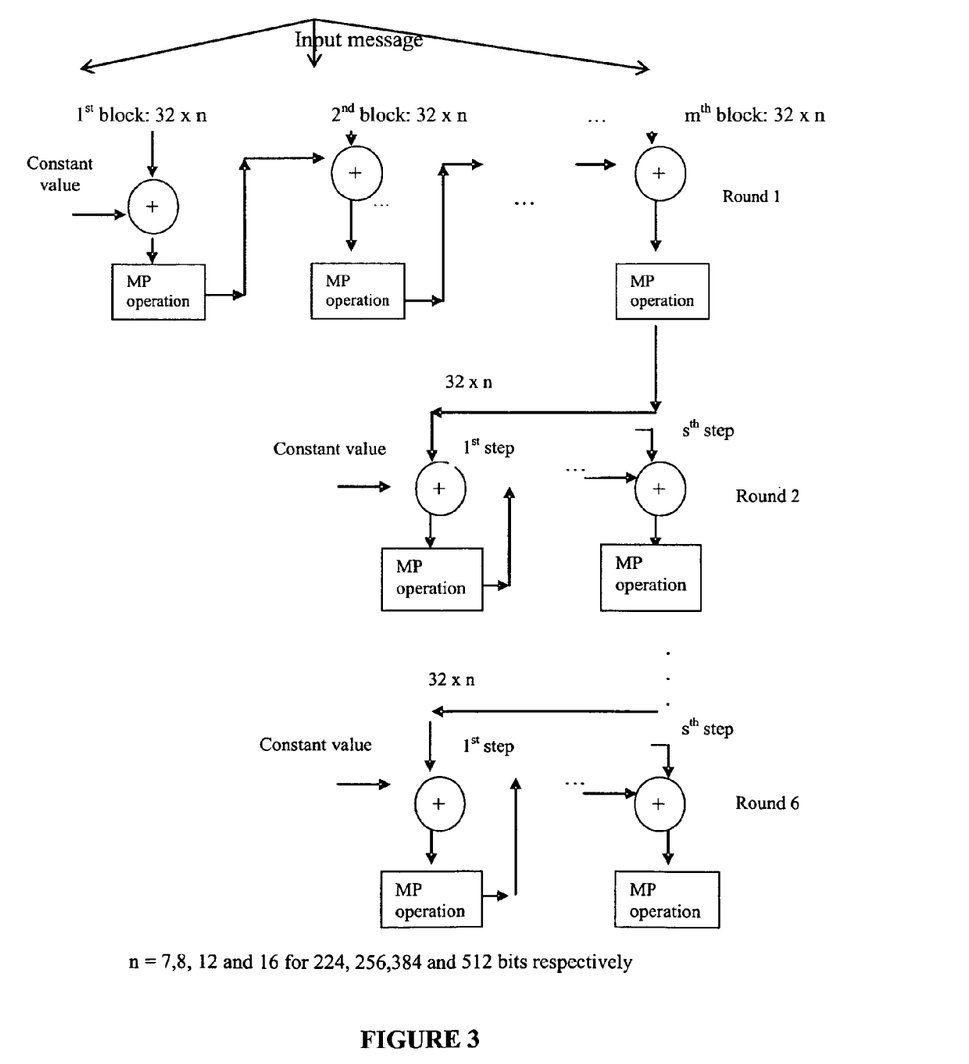
FIG. 3 shows CBC mode with iterative rounds of the hash function in accordance with this invention; P

FIG. 3 shows CBC mode with iterative rounds of the hash function in accordance with this invention. This process/round takes place 6 times in the hash computation using CBC mode. In the first round of CBC mode, a constant value (whose bit length$\leq$message digest length) must be XORed to the first block of the input message and the outcome is passed into the MP operation, which is again XORed with the second block of the input message. This XORing process continues till the end of the last block and produces a message digest of fixed size that is the output of first round. From second round to sixth, the output of previous round is XORed with the same constant value, then the outcome is passed into the MP operation (that is known as first step) and the same process continues till the end of the last step. After completing six rounds, the CBC operation produces a hash output.

For instance, the given message is divided into a sequence of equal sized blocks and the total number of blocks is m. The size of each block is chosen to be 32×n, where n (7/8/12/16) depends upon a message digest length (224/256/384/512 bits). There is no loss of generality to put a constant value=0 in all rounds of CBC operation so that the first block of the input message is directly passed into the first round and the XORing process continues till the end of $m^{th}$ block. From second round to sixth, the output of previous round is passed into the MP operation and the same process goes up to s steps, where s denotes the number of blocks. After completion of six rounds, the hash output of fixed length size (32×n) is obtained. The number of blocks for first round is not always the same as the number of blocks for second round onward.

Figure 4:
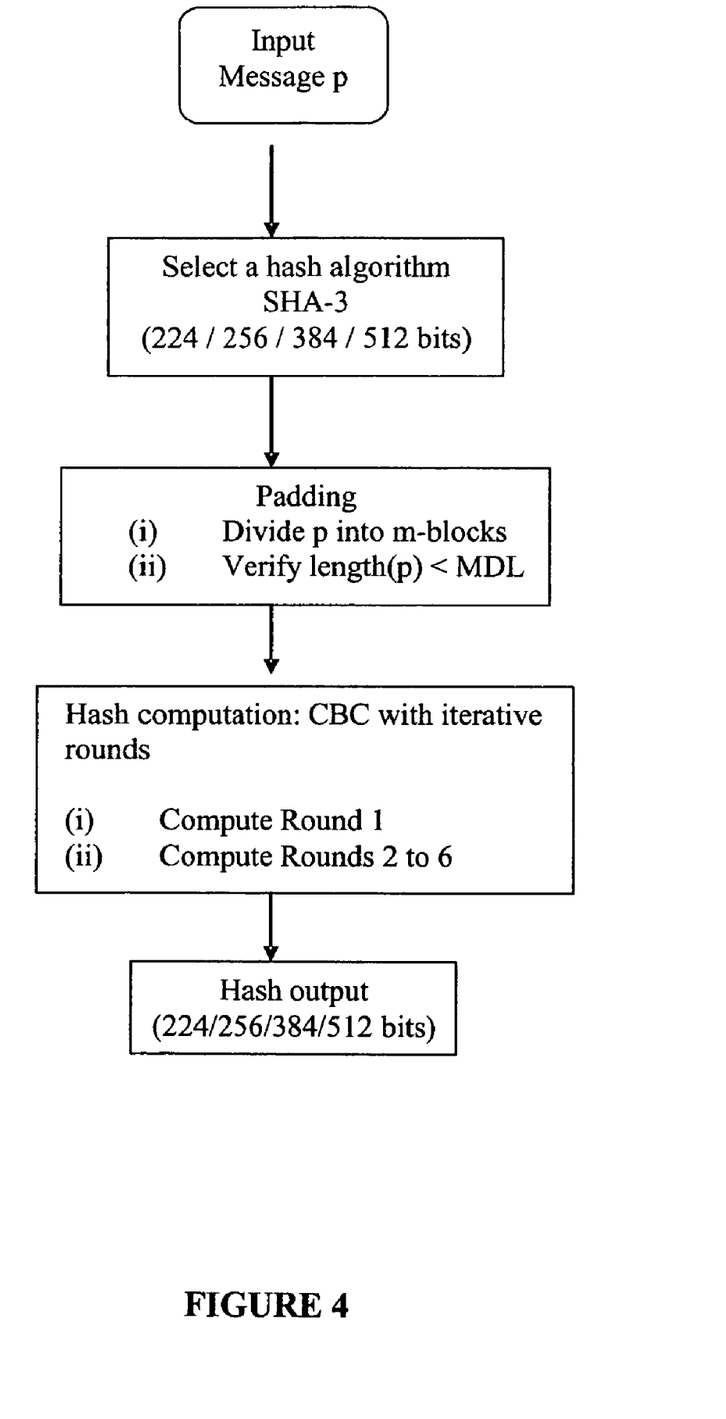
FIG. 4 shows the secure hash algorithm functionality for the system and method to provide the hash value in accordance with this invention.

FIG. 4 shows the secure hash algorithm functionality for the system and method to provide the hash value in accordance with this invention. The method for generating the secure hash algorithm can be listed as follows:
1. Fix the message digest length.
2. Select the secure hash algorithm in terms of number of bits.
3. Input the message for padding.
4. Engage the padding means for performing the padding function, typically to dive the message into m-block having size equal to the message digest length.
5. Engage a comparator means for comparing the size of message with the message digest length.
5.1 If message size is lesser than message digest size, create the initialization vector (IV)
6. Engage the hash computation means in CBC mode with iterative rounds
6.1 message pre processing occurs in first iterative round
6.2 further iterative rounds follow
7. Typically, after 6 iterative rounds, the system belches a hash value of the message.

Figure 5:
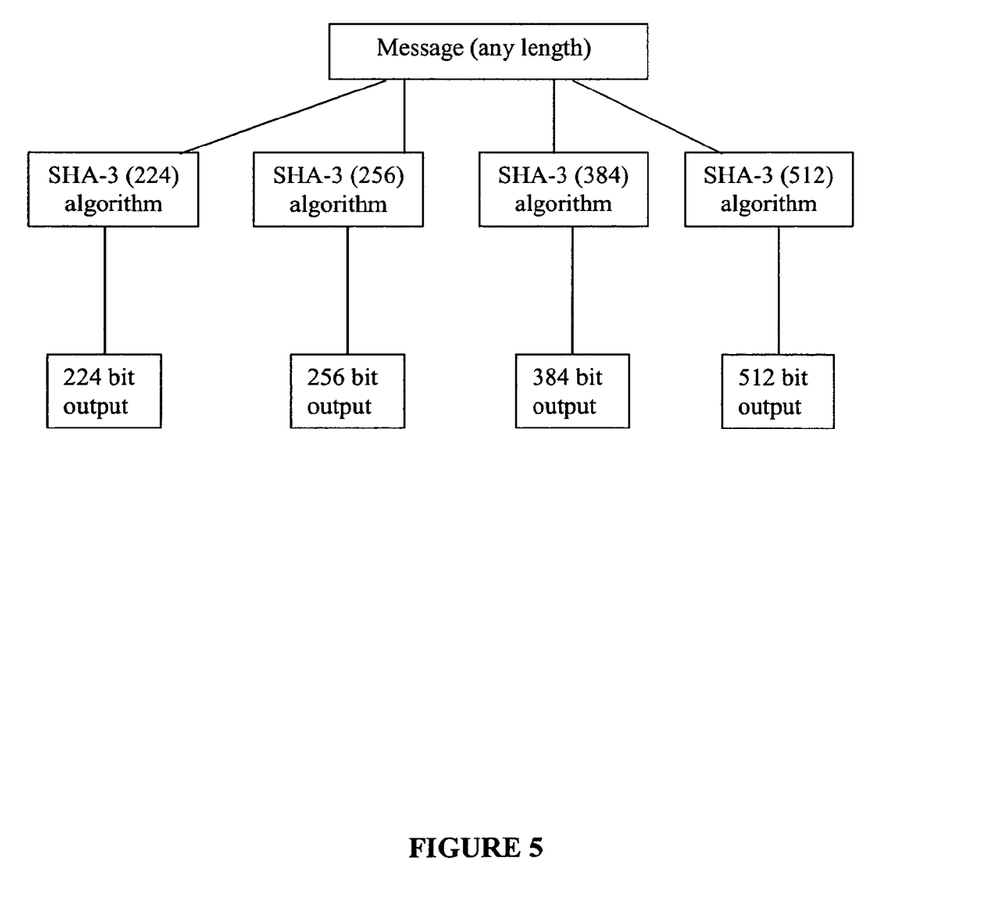
FIG. 5 shows different versions of the secure hash algorithm in accordance with their bit lengths.

FIG. 5 shows different versions of a secure hash algorithm in accordance with their bit lengths. Typically, a secure hash algorithm (224) functionality produces a 224 bit output. Similarly, a secure hash algorithm (256) functionality produces a 256 bit output, a secure hash algorithm (384) functionality produces a 384 bit output, and a secure hash algorithm (512) functionality produces a 512 bit output.

Figure 6:
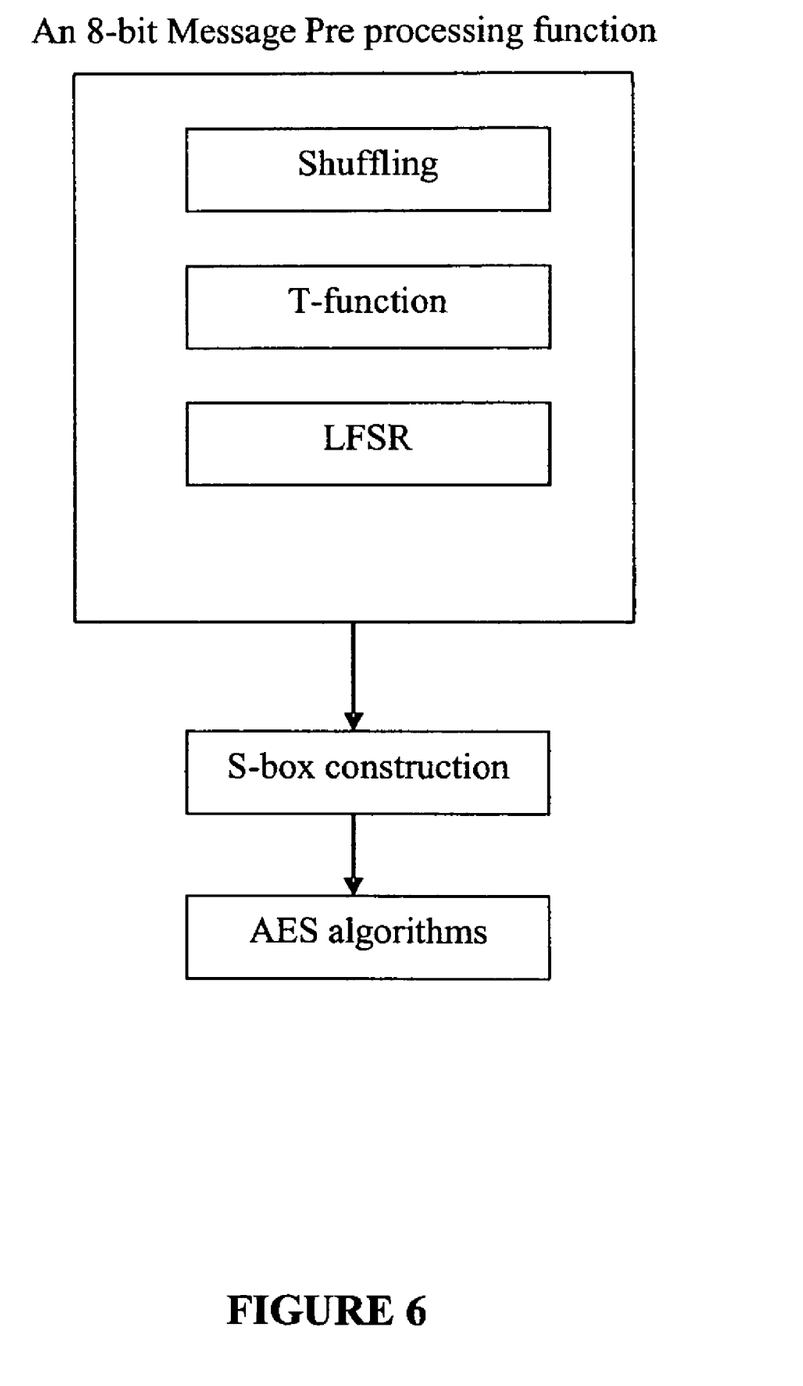
FIG. 6 shows S-box construction.

FIG. 6 shows S-box construction.
The steps are as follows:
1. Initialize a 16×16 matrix.
2. Engage the shuffling means to perform an 8-bit message pre processing
3. Engage the T-functioning means over the output of the shuffling means 4. Engage the Linear Feedback Shift Registering means over the results of the T-functioning means.
5. Repeat the action for 16 times.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. A method for establishing a secure hash function for computing an output message digest from an input message, said method comprising the steps of:
   (a) Receiving an input message for obtaining a corresponding output message digest;
   (b) Determining the length of said output message digest;
   (c) Selecting a secure hash function in terms of said length of said output message digest;
   (d) Dividing said input message into blocks of pre-defined length;
   (e) Engaging a comparator means for comparing the size of said input message with said message digest length;
   (f) Engaging a padding means for performing a padding function of adding an initialization vector to said input message if said input message size is less than said message digest length, said padding function being performed to obtain a padded message divided into m-blocks, each of said m-blocks having size equal to the length of said message digest,
   (g) Engaging a hash computation means in Cipher Block Chaining (CBC) mode with iterative rounds containing message pre-processing processes of Shuffling said padded message to obtain a shuffled message, passing said shuffled message to a T-function to obtain a T-functioned message, and passing the T-functioned message to a Linear Feedback Shift Register to obtain a hash computed value; and
   (h) Outputting a hash output value of the message after a pre-determined number of iterative rounds of said hash computation, each followed by said message pre-processing.

2. The method as claimed in claim 1 wherein after step (f), the process of message processing occurs in the first iterative round and other iterative rounds follow further on.

3. The method as claimed in claim 1 wherein the input message is divided into m blocks of fixed length.

4. The method as claimed in claim 1 wherein the input message is divided into blocks of lengths of 224/256/384/512-bits.

5. The method as claimed in claim 1 wherein the message is subjected to the message pre processing (MP) as a result of hash computation.

6. The method as claimed in claim 1 wherein the message pre-processing involves Shuffling, T-function and Linear feedback registering.

7. The method as claimed in claim 1 wherein the message is divided into 32-bit words and is shuffled on account of shuffling.

8. The method as claimed in claim 1 wherein the bits are interleaved in two halves of each word and the outer end bits remain in the outer position.

9. The method as claimed in claim 1 wherein the shuffling operation is performed on each 32-bit word of the whole padded message.

10. The method as claimed in claim 1 wherein the shuffled message is subjected to a T-function by the T-Functioning means.

11. The method as claimed in claim 1 wherein the T-function updates every bit of that state by $y_i = x_i + f(x_0, \ldots, x_{i-1})$ and then performs the avalanche effect on the shuffled output.

12. The method as claimed in claim 1 wherein the T-function is $(2x^2+x) \bmod 2^{32}$, where x is a 32-bit word.

13. The method as claimed in claim 1 wherein the output got is subjected to the linear feedback register function by the Linear Feedback Shift Registering Means (LFSR).

14. The method as claimed in claim 1 wherein the primitive polynomial for T-functioning used is $x^{32}+x^{26}+x^{23}+x^{22}+x^{16}+x^{12}+x^{11}+x^{10}+x^8+x^7+x^5+x^4+x^2+x+1$.

15. The method as claimed in claim 1 wherein the primitive polynomial for T-functioning used is an irreducible polynomial of degree 32 whose period is $2^{32}-1$.

16. The method as claimed in claim 1 wherein the 32 bit input is executed for different number of rounds.

17. The method as claimed in claim 1 wherein the output is random even in the case of identical input bits.

18. The method as claimed in claim 1 wherein every bit in the binary expression of $x^n$ for said T-functioning is shifted into left except the nth position bit.

19. The method as claimed in claim 1 wherein for nth position bit of said T-functioning, the same binary expression of $x^n$ is to be taken and on adding two binary expressions wrt mod 2, $x^{n+1}$ is got.

20. The method as claimed in claim 1 wherein an output from said T-functioning containing a maximal period cycle is produced.

21. The method as claimed in claim 1 wherein, in the CBC mode, the input message is divided into m-blocks of fixed size which depends upon the message digest length.

22. The method as claimed in claim 1 wherein each block of input is XORed with the output of the previous message pre processing operation of claims 6-20.

23. The method as claimed in claim 1 wherein the process happens six times in hash computation by the cipher block-chaining mode.

24. The method as claimed in claim 1 wherein in the first round of the CBC mode, a constant value bit length equal to message length is XORed to the first block of the input message.

25. The method as claimed in claim 1 wherein the output is then passed onto the MP process.

26. The method as claimed in claim 1 wherein the output got is XORed with the second block of the input message.

27. The method as claimed in claim 1 wherein the XORing is repeated for the end of the last block and a message digest of fixed size is got as the output of the first round.

28. The method as claimed in claim 1 wherein for rounds second to sixth, the output of the previous round is XORed with the same constant value.

29. The method as claimed in claim 1 wherein the output is passes onto the message pre-processing operation till the end of the last step.

30. The method as claimed in claim 1 wherein the CBC operation produces the final hash output after completing six rounds.

31. The method as claimed in claim 1 wherein in CBC mode, each block of plain text is XORed with previous cipher text block before being encrypted thereby ensuring that each cipher text block is dependent on all plain text blocks till that stage.

32. The method as claimed in claim 1 wherein the secure hash function is a one-way hash function.

33. A system for establishing a secure hash function for computing an output message digest from an input message, said system comprising:
- input means adapted to input said message for obtaining a corresponding output message digest;
- determining means adapted to determine the length of said output message digest;
- selection means adapted to select a secure hash function in terms of number of said length of said output message digest;
- division means adapted to divide said input message into blocks of predefined length;
- comparator means adapted to compare the size of said input message with said message digest length;
- padding means adapted to perform a padding function of adding an initialization vector to said input message if said input message size is less than said message digest length, said padding function being performed to obtain a padded message divided into m-blocks, each of said m-blocks having size equal to the length of said message digest;
- hash computation means adapted to perform hash computation in Cipher Block Chaining mode to obtain hash computed value;
- message pre processing means containing shuffling means, T-functioning means, Linear Feedback Shift Registering means adapted to perform message pre processing on said hash computed value; and
- iteration means adapted to performing a pre-determined number of iterations of said hash computation in Cipher Block Chaining mode, each followed by said message pre processing to obtain a hash output value.

34. The system as claimed in claim 33 wherein the padding means performs the padding function to have m-block having size equal to the length of message digest.

35. The system as claimed in claim 33 wherein the comparator means compares the size of message with the message digest length.

36. The system as claimed in claim 33 wherein the hash computation means computes in cipher block chaining (CBC) mode with iterative rounds.

37. The system as claimed in claim 33 wherein the message pre processing means is a bijective function.

38. The system as claimed in claim 33 wherein the message pre processing means further comprises of:
(1) Shuffling means adapted to shuffle said padded message to obtain a shuffled message;
(2) T-Functioning means adapted to perform T-functioning on said shuffled message to obtain a T-functioned message; and
(3) Linear Feedback registering means adapted to perform Linear Feedback Shift Registering on said T-functioned message to obtain a hash computed value.

39. The system as claimed in claim 33 wherein the shuffling means performs shuffling operation by dividing the message into 32 bit words and shuffling the entire padded message.

40. The system as claimed in claim 33 wherein the T-functioning means updates every bit of that state by $y_i = x_i + f(x_0, \ldots, x_{i-1})$ and then performs the avalanche effect on the shuffled output.

41. The system as claimed in claim 33 wherein the Linear Feedback registering means is adapted to perform linear feedback shift register function.

42. The system as claimed in claim 33 wherein the CBC operation produces the final hash output after completing six iterative rounds of hash computation.

* * * * *